Nov. 6, 1962  J. JARRET ET AL  3,062,979
VARIABLE-RELUCTANCE ELECTRIC MACHINES
Filed Feb. 24, 1961  2 Sheets-Sheet 1

INVENTORS
JEAN JARRET, AND JACQUES JARRET by
Bailey, Stephens & Huettig

ATTORNEYS

Nov. 6, 1962  J. JARRET ET AL  3,062,979
VARIABLE-RELUCTANCE ELECTRIC MACHINES
Filed Feb. 24, 1961  2 Sheets-Sheet 2

INVENTORS
JEAN JARRET AND JACQUES JARRET
by Bailey, Stephens & Huettig
ATTORNEYS United States Patent Office 3,062,979
Patented Nov. 6, 1962

3,062,979
VARIABLE-RELUCTANCE ELECTRIC MACHINES
Jean Jarret, La Champanelle, Chemin du Clos-Baron, Fourqueux, France, and Jacques Jarret, 35 Bis, Ave. du Belloy, Le Vesinet, France
Filed Feb. 24, 1961, Ser. No. 91,366
Claims priority, application France Feb. 29, 1960
7 Claims. (Cl. 310—168)

This invention relates to electric machines of the variable-reluctance type.

Such a machine generally comprises two cooperating parts movable relatively to one another, and one of which will herein be termed stator (even though it is not necessarily stationary), and the other will be termed the moving part. The moving part may be either reciprocable or rotatable with respect to the stator, and in the latter instance constitutes a rotor. The stator part comprises one or more pairs of electromagnetic poles while the moving part comprises magnetic portions projecting towards the stator poles and adapted, during the relative movement between the stator and moving part, to pass closely adjacent to the stator poles and define narrow airgaps therewith. The relative movement of the magnetic portions past the stator teeth produce variations in reluctance in the operation of the machine.

While the relative movement of the moving part with respect to the stator is usually one of rotation, in the usual case where the machine is an electric motor or generator, movements of reciprocation are also sometimes used as in electromagnetically operated pumps and other reciprocatory devices.

In the construction of variable-reluctance machines, as in the majority of rotary electric apparatus in general, it is common practice to avoid bringing the material, e.g. iron, in the magnetic circuits close to saturation, in an attempt to maintain the efficiency ratio of the machine at a desirably high level. Usually the machine is so designed that the permeability of the iron is higher than about 100 throughout the major portions of the machine, except adjacent the polar areas where a lower permeability value within a range of say 10-25 is maintained.

In a variable-reluctance machine the electromagnetic torque and hence the power output is proportional to the product of the magnetic field generated by the stator poles and the magnetic flux or magnetizing force of the magnetic projections of the moving part. To increase the torque therefore, it would evidently be desirable to increase the flux in the projections and hence maintain the material thereof close to saturation. Heretofore, however, it has not been found feasible to construct machines of the specified type in which the magnetic projections were saturated, or in fact had a permeability value of less than about 10.

It is an object of this invention to provide an improved variable-reluctance electric machine in which the power output for a given dimensioning of the machine, and specifically the power/mass ratio, will be substantially increased over what has been heretofore thought possible, without any decrease in the efficiency ratio.

In accordance with the invention, there is provided a variable-reluctance electric machine wherein the magnetic portions of the moving part cooperating with the stator poles, are substantially saturated. By this it is meant that the permeability of said portions is in a range of from about 2 to about 10, and preferably no greater than about 8. At the same time, the remaining magnetic portions of the machine are kept substantially unsaturated, by which it is meant that the permeability therein is greater than about 12, and preferably greater than about 15.

The basic feature of the invention residing in the aforementioned reduction in the magnetic permeability of the magnetic portions of the moving part cooperating with the stator poles, as compared to the range of values currently used, may be achieved through various means. Thus said portions may be formed from a suitably selected magnetic material different from that constituting the stator and the remainder of the moving part. However, in accordance with a preferred form of the invention usable instead of or concurrently with the foregoing measure, the average density of the magnetic material in said portions is reduced, as my interspersing in said projections portions thin sheets of iron with sheets or spaces of non magnetic material, e.g. air.

A variable-reluctance machine according to the invention is prefarebly so constructed that the maximum magnetic field present at the stator poles it as least four times, and preferably considerable more times, the field value required to saturate the magnetic portions or teeth of the moving part, and the design is such that the average magnetic induction in said teeth is substantially one half the maximum value of induction provided in the remaining parts of the machine. However, the ratio of the induction in the teeth to the maximum induction in the remaining magnetic circuits in the machine may depart substantially from the said value ½, e.g. may lie within a range of from 40 to 60%, or from 15 to 85%.

The magnetic teeth of the moving part of a machine according to the invention is preferably made from a material having a substantially rectangular characteristic, e.g. pure iron.

In a preferred embodiment of the invention, the stator is provided with at least two similar pairs of poles and the stator and rotor are so constructed that the angular extent of a rotor tooth substantially equals the combined angular extent of one stator pole plus the spacing between adjacent stator poles.

Exemplary embodiments of the invention will now be described with reference to the accompanying drawings, given by way of illustration but not of limitation, and wherein.

Figure 1:
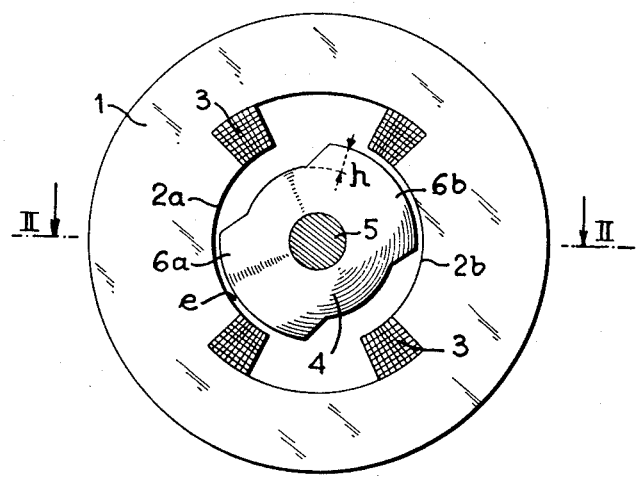
FIG. 1 is a simplified cross sectional view, on line I—I of FIG. 2, of a bipolar synchronous motor constructed in accordance with the invention.
Figure 2:
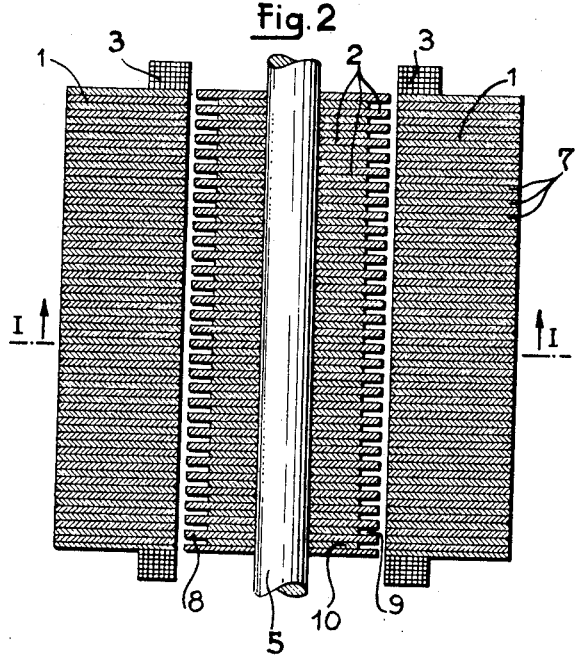
FIG. 2 is a corresponding longitudinal section on line II—II of FIG. 1.

The variable-reluctance rotary machine shown in FIGS. 1 and 2 is a synchronous motor, and comprises a stator 1 formed with the symmetrical pair of poles 2a and 2b each carrying a field winding 3, and a rotor 4 secured on a rotatable shaft 5 and formed with the symmetrical pair of polar projections or teeth 6a, 6b, cooperating with the stator poles. The dimensioning is such, according to well-known practice in machines of the general class to which the invention relates, that the radial width $e$ of the airgap defined between the stator poles and rotor teeth is a very small fraction, preferably not greater than $1/100$, of the radial extent of the rotor teeth $6a$, $6b$.

The construction of the machine in the aspect of it visible in FIG. 1, is generally conventional. However, the invention provides certain constructional features, now to be described, whereby the torque developed by the synchronous motor shown will be considerably increased over the range heretofore attainable, other things being equal, and will in fact approximate the maximum possible torque, while retaining a satisfactory efficiency ratio. In attaining this dual objective, the invention provides means for, on the one hand, maintaining the rotor teeth $6a$, $6b$ substantially at magnetic saturation, i.e. with a low magnetic permeability, while, on the other hand, keeping the magnetic circuits of the stator and remaining portions of the rotor in a condition remote from saturation, i.e. with a substantial permeability value, at least greater than about 15.

For this purpose in the embodiment shown the stator 1 is formed as a stack of sheets 7 of silicon steel or the like high-permeability material, wherein the maximum flux density (adjacent the polar surfaces) may equal e.g. 23,000 gauss, corresponding to a permeability of 15. The rotor 4 on the other hand is made as a set of axially spaced strips or sheets of high-purity iron separated by spacer disks 10 which do not extend radially as far out as the rotor tooth portions $6a$, $6b$, so that the iron strips in said portions are separated by airgaps. The spacer disks may be made from a magnetic material such as silicon steel. A simple calculation will show that with the stator and rotor constructed as just described, the above specified conditions relating to high saturation in the rotor teeth coupled with low saturation in the stator and remainder of the magnetic circuits of the machine, can be readily attained.

The maximum induction or flux density in the silicon-steel stator sheets 7 as obtained adjacent the polar surfaces, is selected equal to $C = 23,000$ gauss, corresponding to the permeability value of 15 previously selected. The average induction or flux density B for saturating the rotor teeth $6a$, $6b$ is then selected at a value of about $0.5C$, which is an optimum ratio as will later be explained, i.e. a value of about 11,500 gauss. Assuming the saturation flux density of the high-purity iron from which the rotor is made is 21,500 gauss, then to obtain the desired average flux density of 11,500 gauss just mentioned in the rotor teeth, it is necessary that the volume of the iron strips 8 in the rotor teeth should represent a fraction of 11,500/21,000 of the total volume of said teeth, i.e. 53% of such total volume. Assuming pure iron strip of 0.5 mm. gauge is used in making up the rotor, then the air spaces between the adjacent strips 8 should be $0.5 \times (47/53) = 0.44$ mm. wide, this being obtained by using spacer disks 10 having a thickness of 0.44 mm.

In the operation of the machine described, when the field windings 3 of the stator are energized with current of a value to generate a magnetic field of 11,500 oersteds adjacent the stator poles $2a$ and $2b$, the average flux density in the rotor teeth is substantially equal to the sum of the flux density in the airspaces defined between the stator pole surfaces and the smaller-radius cylindrical surface portions of the rotor, i.e. 11,500 gauss, plus the average saturation flux density in the teeth, i.e. 11,500 gauss also, or a total of 23,000 gauss. The flux density in the stator poles adjacent the rotor teeth which is essentially the same as the average flux density in the teeth, i.e. 23,000 gauss as predetermined, will therefore not exceed the prescribed value, corresponding to the minimum permeability value of 15. Hence, the machine as constructed will operate to develop a torque close to its maximum value owing to the low saturation in the rotor teeth, while at the same time retaining a high efficiency ratio since all remaining portions of the magnetic circuit including especially the stator poles, are kept away from the saturated condition in that their permeability value is substantially higher than 15.

It will be understood that when, in operation, a strong magnetic field H (e.g. about 10,000 oersteds) is obtained between the stator poles and the reduced-radius cylindrical part of the rotor, and as a rotor tooth enters the area covered by a stator pole, then the electromagnetic force F applied to the rotor is proportional both to the transverse sectional area of the rotor tooth (on a radial plane), and to the product of said field H by the average saturation flux density B of the tooth; since moreover the teeth are saturated, this average flux density B is the same as the average magnetization intensity in the tooth.

Provided the field H is considerably higher than that required to saturate the teeth, e.g. at least four times and preferably at least ten or more times higher, a condition that is easily fulfilled by using a suitable magnetic material for the rotor teeth such as the high-purity iron mentioned above, then it is easily shown by simple calculation that the sum of the magnetic field H plus average saturation flux density B in the teeth is substantially equal to the average flux density C selected for the stator poles and the cylindrical portion of the rotor between the rotor teeth.

Thus, in the machine described, $H + B = C$, C being a prescribed value. As to the magnetic force F applied to each rotor tooth this is proportional to the product $H \times B$. It will be understood that it is most desirable in practice to make the force F as large as possible in a machine of given size and remaining structural characteristics, since both the developed torque and the power/mass ratio of the machine are proportional to the force F.

In order to make the quantity $F = H \times B$ a maximum, possible, remembering that the sum $H + B$ of the factors in this product is equal to a constant C, it is well known from elementary arithmetic that the two factors in the product should be made equal, i.e. $H = B = \frac{1}{2}C$. It is also known that as the two factors H and B depart gradually from their optimal value $\frac{1}{2}C$ in opposite sides, the product of said factors, which product equals F times a proportionality factor $k$, varies parabolically, i.e. decreases first at a very slow rate, then increasingly fast. This is illustrated in the following tabulation:

| Values of— | | | Percent Reduction in F |
|---|---|---|---|
| H | B | $kF = H \times B$ | |
| 0.5C | 0.5C | 0.25C | 0 |
| 0.4C | 0.6C | 0.24C | 4 |
| 0.3C | 0.7C | 0.21C | 16 |
| 0.25C | 0.75C | 0.19C | 24 |
| 0.20C | 0.80C | 0.16C | 36 |
| 0.15C | 0.85C | 0.13C | 48 |
| 0.10C | 0.90C | 0.09C | 64 |
| 0.05C | 0.95C | 0.05C | 80 |

According to the invention, the relative values of H and B should be selected as close as practical to the common optimal value of 0.5C. However, the above table shows that considerable departures may be tolerated from this theoretical optimum while still retaining the benefits of the invention. Thus, in view of various practical considerations in the manufacture of the machine, it may sometimes be desirable to select one of the two values H and B as small as 0.15C and the other as large as 0.85C, in which case the percentage reduction in the resulting force F is less than one-half from its maximal value. Preferably however one of the two values of H and F is selected not lower than 0.30C and not higher than 0.70C, in which case the magnetic force F is not less than 84% of its theoretical maximum as shown by the above table.

The same statement can be expressed in different terms as follows: according to the invention, the machine is so constructed that the average magnetization intensity in the rotor teeth should lie within the range of from about 60% to 333% (or preferably from about 85% to about 125%, the optimum value being about 100%), of the magnetic field present adjacent the stator poles. That the two statements are equivalent can easily be shown as follows: consider for example an average magnetic field strength of 10,000; the maximum flux density is 20,000 gauss. Then, considering the broad above-mentioned range of 15%–85%, 15% over 20,000 is 3,000 and 85% over 20,000 is 17,000. Referring these average field strength values present in the rotor teeth to the 10,000 gauss magnetic field present adjacent the stator poles, it is seen that the respective ratios are 10,000/3,000=333%, and 10,000/17,000=59%, rounded off to 60%.

While it has been indicated that maximum power/mass ratio is obtained when the values of H and B are equal, and each being equal to 0.5C, it should be understood that this statement is not always strictly true. In some cases, e.g. if the magnetic field H does not remain uniform over the total displacement of a tooth past a stator pole but varies (e.g. sinusoidally) during such displacement, then the optimum ratio may depart somewhat from that indicated.

In order to ensure that the magnetic field required to saturate the teeth is low in comparison to the magnetic field H created by the stator poles, the rotor teeth should be made from a material having a relatively rectangular magnetization curve, such as the high-purity iron mentioned earlier. Thus, in the case of iron containing 99.98% Fe, 95% of the saturation flux density are attained with a magnetic field less than 200 oersteds, which of course is many times lower than the usual maximum value of say 11,000 to 12,000 oersteds for the field H.

The above considerations show how it is possible in all cases to construct the stator and rotor of a variable reluctance machine of given power rating so as to fulfill the dual condition taught by the invention and achieve the advantages accompanying the fulfillment of such condition.

Figure 3:
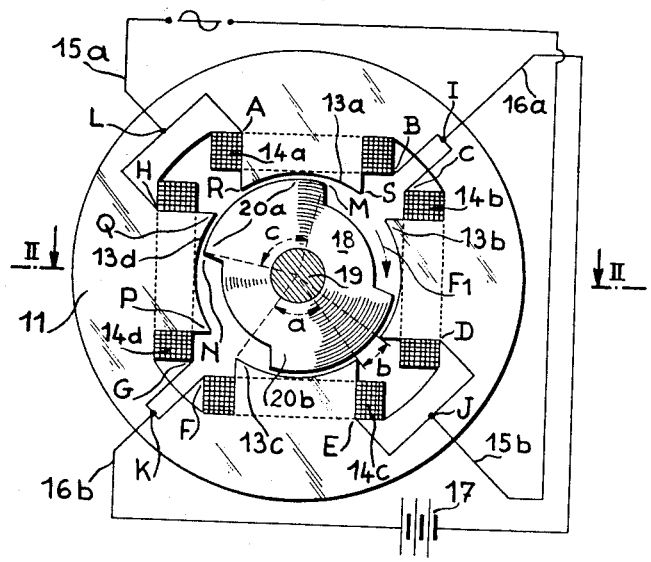
FIG. 3 is a view similar to FIG. 1 showing a four-pole alternator according to the invention.

FIG. 3 of the drawings illustrates a four-pole alternator constructed in accordance with the invention. The alternator comprises an annular stator 11 formed with the four equispaced polar projections 13a, 13b, 13c and 13d, and a rotor 18 secured on a rotatable shaft 19 and formed with the pair of opposite magnetic projecting portions or teeth 20a, 20b. Both the stator and rotor are constructed in accordance with the teachings of the invention, e.g. in the manner explained in connection with FIGS. 1 and 2, so as to provide a high degree of saturation within the rotor portions 20a, 20b while providing a substantially unsaturated magnetic condition in the remaining magnetic circuit portions of the alternator including especially the stator poles.

Each of the four stator poles 13a through 13d carries a respective field winding 14a through 14d. The four windings have their adjacent ends B—C, D—E, F—G and H—A, connected together and to a common one of the four terminals I, J, K and L, which thus form the four apices of an impedance bridge. Across the bridge diagonal I—K, an excitation voltage is applied from D.-C. excitation source 17 having its poles connected through lines 16a and 16b to terminals I and K respectively. From the other bridge diagonal K—L, the output alternating voltage is derived through the lines 15a and 15b.

In accordance with a preferred arrangement in this form of the invention, the angle c subtended by each of the two rotor teeth 20a, 20b, is made equal to the sum of the angle a subtended by one stator pole such as 13c plus the angle b subtended by an interpolar space of the stator.

In operation, considering the rotor 18 to be revolving clockwise (arrow F1), it is evident that as the leading end M of either rotor tooth, say 20a, is moving past the leading end R of a stator pole, e.g. 13a, then the trailing end N of the same rotor tooth is moving past the leading end P of the stator pole 13d immediately preceding said first pole 13a. Hence, the magnetic flux traversing winding 14d of pole 13d is decreasing at the same rate as the flux through winding 14a of pole 13a is increasing. In other words the rates of flux variation in any pair of adjacent stator poles such as 13a and 13d are equal but reverse at any given instant of time. As a result the induced E.M.F.'s in the two windings 14a and 14d at any time are equal and opposite in sign (or phase condition), and the opposed terminals I and K of the bridge circuit are at all times at equal A.-C. potentials, so that there is no circulation of alternating current through the D.-C. excitation lines 16a and 16b. All of the input energy applied as mechanical energy of rotation to rotor shaft 19 is collected (neglecting inevitable minor losses in the magnetic and electric circuits) as alternating voltage energy across the output terminals J and L of the bridge circuit, so that the efficiency ratio is at a maximum. It is essential to observe that this highly desirable mode of operation is only made possible by the basic teaching of the invention that the magnetic teeth of rotor 18 are substantially saturated while the remaining magnetic circuit portions of the alternator are unsaturated. Otherwise, the rates of flux variation in adjacent stator poles would not at all times retain equal absolute values and opposite signs, nor would the excitation terminals I and K be at all times at equal A.-C. potentials as described above.

It will be understood that various modifications may be made in the embodiments shown and described, as by varying the number and configuration of stator poles and/or magnetic portions of the rotor, and that the teachings of the invention may be applied to variable-reluctance machines of other types than those shown, including both motors and generators, wherein the movable part of the machine may be a rotor, as shown, or a reciprocating member.

What we claim is:

1. In a variable-reluctance electrical machine having a stationary part and a relatively movable part, magnetic poles formed on the stationary part and magnetizing windings associated with said poles, and magnetic portions formed on the movable part projecting into close proximity with said poles for electromagnetic cooperation with the field created by said magnetizing windings, the improvement that said projecting portions are constructed from a set of spaced strip-like elements of magnetic material whereby said material is magnetically saturated for a value of said magnetizing field substantially lower than the value for which said poles and remaining portions of said movable part are saturated.

2. In a variable-reluctance machine having a stator and a rotor, magnetic poles on the stator and magnetizing windings associated therewith and magnetic portions on the rotor projecting into close proximity with said poles for coaction with the field created by the windings, the improvement that said rotor comprises a stack of strips of magnetic material in planes normal to the rotor axis and each contoured to provide corresponding projecting portions constituting in combination said projecting portions of the rotor, and spacer strips of magnetic material interposed between said first strips and so contoured as to leave free gaps between said projecting portions of the first strips.

3. In a machine as claimed in claim 1, the use of magnetic material having a relatively rectangular magnetization curve in constructing said projecting portions.

4. A machine as claimed in claim 1, wherein the average saturation flux density in said projecting portions is about one half the maximum flux density created by said field in said poles and remaining portions of said movable part.

5. A machine as claimed in claim 1, wherein the average saturation flux density in said projecting portions is within a range of from about 30% to about 70% of the maximum flux density created by said field in said poles and remaining portions of said movable part.

6. A machine as claimed in claim 2, wherein said stator has at least two pairs of poles formed thereon in angularly equispaced relation, and said projecting rotor portions each have an angular extent as measured around the rotor axis equal to the combined angular extent of one stator pole plus one interpolar space of said stator.

7. A machine as claimed in claim 2 wherein said stator has two pairs of angularly equispaced poles and said projecting rotor portions each have an angular extent as measured around the rotor axis equal to the combined angular extent of a stator plus one interpolar space, and wherein the magnetizing windings associated with the respective poles are connected in an impedance bridge circuit, D.-C. connections connected with a first pair of opposed terminals of said bridge circuit and A.-C. connections connected with the remaining pair of opposed terminals of said bridge circuit, whereby in operation substantially no A.-C. current will flow through said D.C. connections.

References Cited in the file of this patent
UNITED STATES PATENTS

| | | |
|---|---|---|
| 476,818 | Pike et al. | June 14, 1892 |
| 1,551,271 | Slepian | Aug. 25, 1925 |
| 1,971,793 | O'Leary | Aug. 28, 1934 |